July 22, 1924.
C. B. ROWLAND
1,502,059
AGRICULTURAL ASSORTING MACHINE
Filed Jan. 19, 1922    2 Sheets-Sheet 1
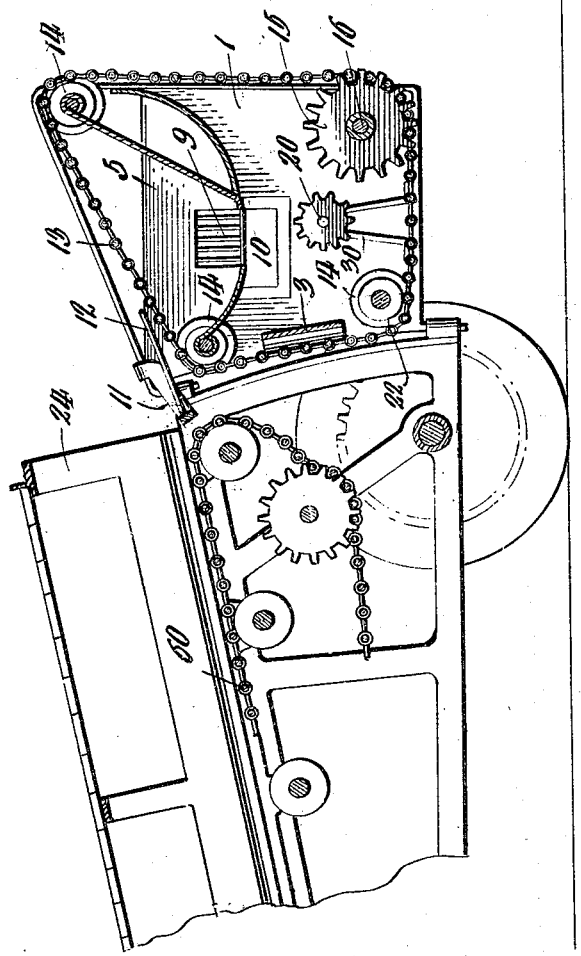
WITNESSES
Guy M Spring
Inventor
CLIFFORD B. ROWLAND
By Richard B Owen
Attorney July 22, 1924.
C. B. ROWLAND
1,502,059
AGRICULTURAL ASSORTING MACHINE
Filed Jan. 19, 1922   2 Sheets-Sheet 2
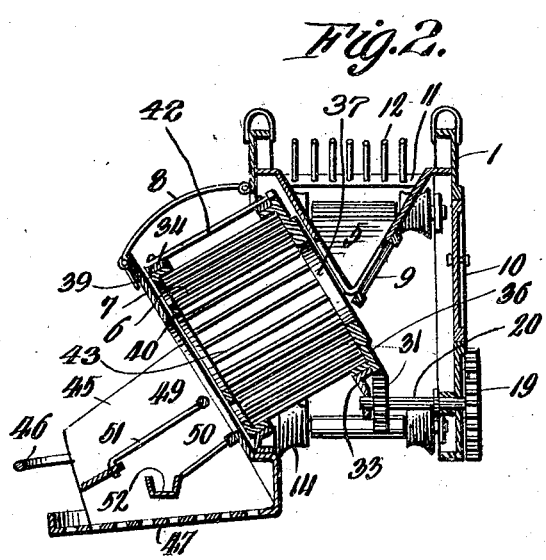
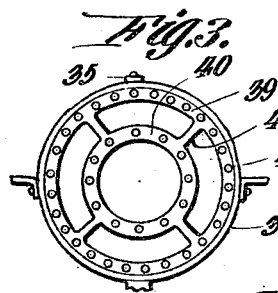
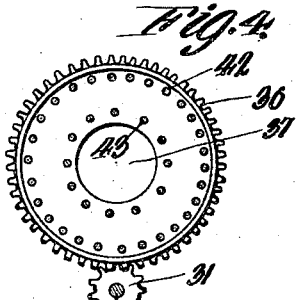
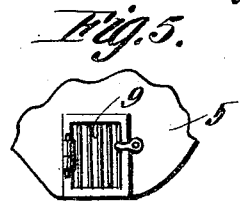
WITNESSES
Inventor
Clifford B. Rowland
By Richard B. Owen
Attorney Patented July 22, 1924.

1,502,059

UNITED STATES PATENT OFFICE.

CLIFFORD B. ROWLAND, OF TRENTON, NEW JERSEY.

AGRICULTURAL ASSORTING MACHINE.

Application filed January 19, 1922. Serial No. 530,343.

*To all whom it may concern:*

Be it known that I, CLIFFORD B. ROWLAND, a citizen of the United States, residing at Trenton, in the county of Mercer and State of New Jersey, have invented certain new and useful Improvements in an Agricultural Assorting Machine, of which the following is a specification.

The present invention relates to an agricultural assorting machine and is especially designed to be used for assorting such vegetables as potatoes and has for its principal object to separate the potatoes according to size.

Another object of the invention is to provide a movable chain assorting member which will prevent sticks and other large objects which may be delivered to the device from entering into the assorting machine.

Another important object of the invention is to provide a rotary assorter which will tend to cleanse the potatoes of all foreign matter.

With the above and numerous other objects in view the invention resides in certain novel features of construction, and the combination and arrangement of parts as will be hereinafter more fully described and claimed.

In the drawing:—

Figure 1 is a vertical longitudinal section taken through the machine and also through the agricultural machine to which it is attached, Figure 2 is a transverse section through the machine, Figure 3 is an end elevation of the assorting drum, Figure 4 is a section taken therethrough, and Figure 5 is a detailed view of a portion of the hopper.

Referring to the drawings in detail it will be seen that the machine consists of a frame 1. The main hopper 5 is situated at the upper end of the frame 1 and is provided with an opening in its bottom that leads to a rotary assorting member 6 situated to one side of the machine and extending into the frame 1. A door or hinged section 9 is provided adjacent the opening in the bottom of the hopper 5 so as to facilitate the cleaning of the machine by allowing easy access to the entrance of the rotary assorting member 6. It will also be noted that the frame 1 is provided with an opening having a hinged closure 10 through which access may be had to the hinged member 9.

An extension frame 11 is provided at the forward end of the hopper and has situated therein so as to extend rearwardly and to be inclined upwardly a plurality of tines or prongs 12 that lead over the chain assorting member 13 which is trained over the three idler pulleys or rollers 14 provided in the corners of the frame 1 except for the rear lower corner in which is situated the sprockets 15 carried on the shaft 16 which is journalled in the frame 1. This chain assorting member 13 has sufficient space between its cross members 25 so as to allow the vegetables to drop therebetween into the hopper and to deliver any foreign matter such as roots, sticks or stones that may be dug up by the machine 24 to the rear onto the ground.

A bracket 30 is carried by the frame 1 and has journalled therein the shaft 20 which carries at one end a gear 31 which is situated at mid distance between the sides of the frame 1 and the end of the shaft is journalled in a bracket 33 as shown to advantage in Figure 2. The inner end of the rotary assorter 6 consists of a gear 36 having a central opening 37 that forms the entrance thereto. This gear 36 is in mesh with the gear 31 and is driven thereby. The other end of the rotary assorter consists of an outer ring 39 and an inner ring 40. An annular series of bars 42 are arranged in the outer ring 39 and the gear 36 adjacent its teeth so as to be spaced from a second annular series of bars 43 extending from the inner ring 40 to the gear 36 adjacent the periphery of its opening 37 whereby there is formed two assorting drums one within the other and the bars of the inner drum namely 43 are spaced farther from each other than the bars 42 of the outer drum so that potatoes of a certain size would pass between the bars 43 to the outer drum and the potatoes which would not pass through the bars 43 would be delivered past the ring 40 into a chute 45 which communicates with a receptacle, not shown, adapted to be placed within the loop 46 and rest upon the portion of the platform 47 immediately therebelow. This platform 47 extends from the frame 2 and supports the chute 45 which is divided into an upper compartment 49 and a lower compartment 50. These compartments are separated by the bars 51 which are suitably spaced from each other so that any small potatoes or vegetables which may have reached the upper compartment through inadvertance would pass through into the lower compartment 50 which has a transverse trough 52 leading toward the rear of the machine so that a receptacle may be placed under its outlet and rest on the platform 47.

The frame is supported on the machine 24 in any suitable manner to the rear thereof and the shaft 16 is rotated in any suitable manner from this machine. The gear 19 is also rotated from the machine in any suitable manner.

The machine 24 is preferably a combined tractor and digger which digs the potatoes out of the ground and conveys them rearwardly by the chain conveyor 60 upon the prongs 12 from which they engage the chain separator 13 and drop into the hopper 5.

The accompanying drawing and the above description refer to the preferred embodiment of my invention and it should, of course, be understood that I am not limited to details of construction, and the combination and arrangement of parts except as hereinafter claimed.

Having thus described my invention what I claim as new is:—

1. An agricultural assorting machine of the class described including a hopper of V-shaped sectional formation having an opening in one side, a cleaning device at the top of the hopper, and a rotary separator mounted adjacent to the opening in the side of the hopper, said rotary separator being disposed with its sides in parallelism with said side of the hopper so as to be inclined.

2. An agricultural assorting machine including a rotary member comprising an inner drum and an outer drum spaced from each other, each drum provided with an annular series of spaced bars, a hopper of V-shaped sectional formation having an opening in one side, said rotary member being disposed adjacent the side of the hopper having the opening so that the series of bars of said drums extend perpendicularly from said side of the hopper having the opening whereby the rotary member is positioned in an inclined position.

3. An agricultural assorting machine of the class described including a frame, a hopper of V-shaped sectional formation having an opening in one side mounted in the frame, a cleaning device at the top of the hopper, a rotary separator mounted in the frame adjacent to the opening in the side of the hopper, said rotary separator being disposed with its sides in parallelism with said side of the hopper so as to be inclined, the side of said separator adjacent the hopper being in the form of gear having peripheral teeth, a drive shaft journalled in one side of the frame and terminating intermediate the sides of the frame, and a gear on the termination of the shaft meshing with the teeth of the side in the form of a gear of the rotary separator.

In testimony whereof I affix my signature in presence of two witnesses.

CLIFFORD B. ROWLAND.

Witnesses:
   MAHLON T. VOORHEES,
   ANTIONETTE ANDERSON.